US012683146B2

(12) United States Patent
Takahashi et al.

(10) Patent No.: US 12,683,146 B2
(45) Date of Patent: Jul. 14, 2026

(54) SECONDARY BATTERY

(71) Applicant: Panasonic Intellectual Property Management Co., Ltd., Osaka (JP)

(72) Inventors: Takahiro Takahashi, Osaka (JP); Kazuhiro Yoshii, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 851 days.

(21) Appl. No.: 17/441,458

(22) PCT Filed: Jan. 21, 2020

(86) PCT No.: PCT/JP2020/001881
§ 371 (c)(1),
(2) Date: Sep. 21, 2021

(87) PCT Pub. No.: WO2020/195055
PCT Pub. Date: Oct. 1, 2020

(65) Prior Publication Data
US 2022/0166004 A1 May 26, 2022

(30) Foreign Application Priority Data
Mar. 27, 2019 (JP) ................................. 2019-059615

(51) Int. Cl.
*H01M 4/36* (2006.01)
*H01M 4/58* (2010.01)
*H01M 4/02* (2006.01)

(52) U.S. Cl.
CPC ......... *H01M 4/364* (2013.01); *H01M 4/5825* (2013.01); *H01M 2004/021* (2013.01); *H01M 2004/027* (2013.01); *H01M 2004/028* (2013.01)

(58) Field of Classification Search
None
See application file for complete search history.

(56) References Cited

U.S. PATENT DOCUMENTS

2003/0068551 A1*  4/2003  Fukunaga ............. H01M 4/621
                                                    252/182.1
2005/0170258 A1*  8/2005  Kawakami ........ H01M 10/0525
                                                    429/231.1
(Continued)

FOREIGN PATENT DOCUMENTS

CN       102487137 A      6/2012
CN       107683301 A      2/2018
(Continued)

OTHER PUBLICATIONS

English Translation of Chinese Search Report dated Oct. 30, 2023, issued in counterpart CN application No. 202080024426.4. (3 pages).
(Continued)

*Primary Examiner* — Amanda J Barrow
(74) *Attorney, Agent, or Firm* — WHDA, LLP

(57) ABSTRACT

An exemplary secondary battery comprises: a positive electrode including a positive electrode core, a positive electrode mixture layer provided on the positive electrode core, and a surface layer that is in direct contact with the positive electrode mixture layer at a position opposite to the positive electrode core across the positive electrode mixture layer, and that contains an inorganic compound; a negative electrode; and a separator located between the positive electrode and the negative electrode. Another exemplary secondary battery comprises: a negative electrode including a negative electrode core, a negative electrode mixture layer provided on the negative electrode core, and a surface layer that is in direct contact with the negative electrode mixture layer at a position opposite to the negative electrode core across the
(Continued)

negative electrode mixture layer, and that contains an inorganic compound; a positive electrode; and a separator located between the positive electrode and the negative electrode.

5 Claims, 4 Drawing Sheets

(56)                References Cited

U.S. PATENT DOCUMENTS

| | | | |
|---|---|---|---|
| 2011/0189378 A1 | 8/2011 | Moon et al. | |
| 2012/0021264 A1* | 1/2012 | Morishima | H01M 10/0587 |
| | | | 29/623.5 |
| 2012/0141877 A1 | 6/2012 | Choi et al. | |
| 2013/0244116 A1 | 9/2013 | Watanabe et al. | |
| 2014/0023921 A1* | 1/2014 | Lee | H01M 4/366 |
| | | | 427/126.6 |
| 2015/0287985 A1 | 10/2015 | Miki | |
| 2016/0190566 A1* | 6/2016 | Shiozaki | H01M 4/661 |
| | | | 429/231.1 |
| 2017/0012282 A1 | 1/2017 | Kondo et al. | |
| 2017/0047579 A1* | 2/2017 | Suehiro | H01M 4/525 |
| 2017/0309915 A1* | 10/2017 | Lee | H01M 10/052 |
| 2018/0175353 A1* | 6/2018 | Sakimoto | B32B 3/26 |
| 2020/0020924 A1* | 1/2020 | Takezawa | H01M 4/661 |

FOREIGN PATENT DOCUMENTS

| | | | | |
|---|---|---|---|---|
| EP | 3 312221 | * | 4/2018 | C08J 9/00 |
| EP | 3312221 A1 | | 4/2018 | |
| JP | 2000-133316 A | | 5/2000 | |
| JP | 2011-165663 A | | 8/2011 | |
| JP | 5525630 B2 | | 6/2014 | |
| JP | 2015-201252 A | | 11/2015 | |
| WO | 2015/114692 A1 | | 8/2015 | |
| WO | 2018/179900 A1 | | 10/2018 | |
| WO | WO 2018/179900 | * | 10/2018 | H01M 4/131 |

OTHER PUBLICATIONS

The Extended European Search Report dated Jul. 21, 2022, issued in counterpart Ep Application No. 20776973.8. (10 pages).
International Search Report dated Mar. 24, 2020, issued in counterpart International Application No. PCT/JP2020/001881 (3 pages).

* cited by examiner $$\frac{1}{20}\sum_{n=1}^{20}\theta n = 90°$$

SECONDARY BATTERY

TECHNICAL FIELD

The present disclosure relates to a secondary battery.

BACKGROUND

An electrode constituting a secondary battery generally comprises a metal core and a mixture layer provided on a surface of the core. For example, Patent Document 1 discloses an electrode for a non-aqueous electrolyte secondary battery, the electrode comprising: a mixture layer containing an active material; and a porous insulation layer provided on a surface of the mixture layer, wherein the insulation layer has a surface roughness of 0.2 μm to 0.4 μm, and a mixed layer containing the component of the insulation layer and the component of the mixture layer is formed at an interface between the insulation layer and the mixture layer.

CITATION LIST

Patent Literature

PATENT LITERATURE 1: Japanese Patent No. 5525630

SUMMARY

In a secondary battery such as a lithium ion battery, suppression of the internal resistance to a low level is an important issue. The technology disclosed in Patent Document 1 still has room for improvement, especially in reducing the battery internal resistance.

A secondary battery according to one aspect of the present disclosure has: a positive electrode including a positive electrode core and a positive electrode mixture layer provided on a surface of the positive electrode core; and a negative electrode including a negative electrode core and a negative electrode mixture layer provided on a surface of the negative electrode core. At least one of the positive electrode mixture layer and the negative electrode mixture layer has a layer thickness variation coefficient of 0.01 to 0.30 or a layer surface tortuosity factor of 1.2 to 2.0. Preferably, at least one of the positive electrode mixture layer and the negative electrode mixture layer has a layer thickness variation coefficient of 0.01 to 0.30 and a layer surface tortuosity factor of 1.2 to 2.0.

According to one aspect of the present disclosure, a secondary battery having a low internal resistance can be provided.

DESCRIPTION OF EMBODIMENTS

As noted above, suppression of the internal resistance to a low level is an important issue in a secondary battery such as a lithium ion battery. To resolve this issue, the present inventors made a diligent study focusing on the surface of a mixture layer containing an active material, and discovered as a result that, by controlling the thickness variation coefficient of the mixture layer to 0.01 to 0.30 or by controlling the surface tortuosity factor of the mixture layer to 1.2 to 2.0, the internal resistance of the secondary battery using such an electrode becomes specifically reduced. When the thickness variation coefficient and the like of the mixture layer are within the above-noted ranges, it is considered that appropriate unevenness is formed on the mixture layer surface so that the reaction resistance becomes reduced, which in turn reduces the internal resistance of the battery. In the present specification, a mixture layer surface denotes a surface of the electrode located on an outer side that is opposite to the core.

An example embodiment of a secondary battery according to the present disclosure will now be described in detail. Although a cylindrical battery in which a spiral-type electrode assembly 14 is housed in a bottomed cylindrical outer can 16 is described below as an example, the outer housing is not limited to a cylindrical outer can, and may for example be an outer can having a square shape, a coin shape, or the like, or may be an outer housing made of a laminate sheet. Further, the electrode assembly may be a laminate-type electrode assembly in which a plurality of positive electrodes and a plurality of negative electrodes are alternately laminated via separators.

Figure 1:
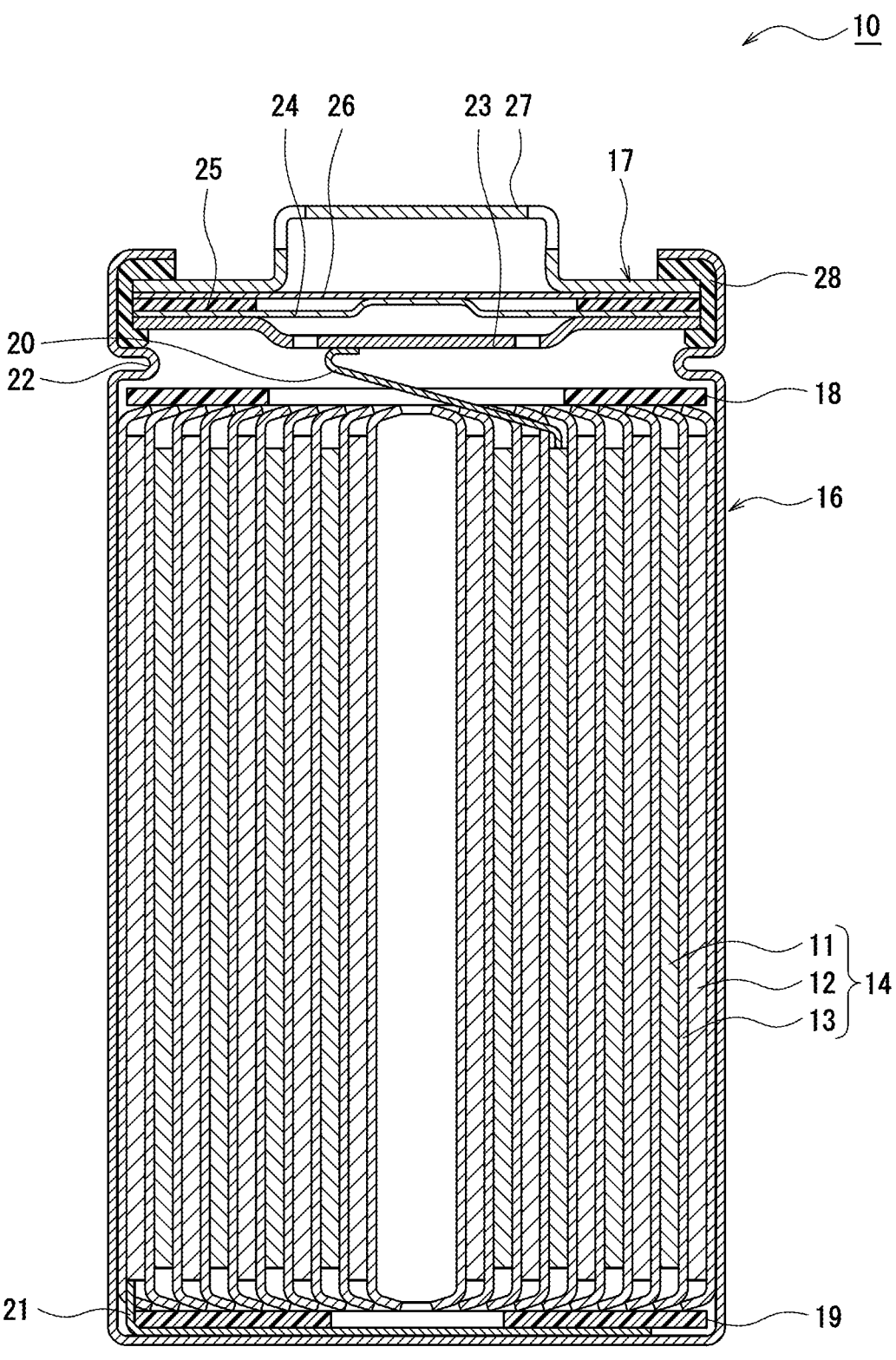
FIG. 1 is a cross-sectional view of a secondary battery according to an example embodiment.

FIG. 1 is a cross-sectional view of a secondary battery 10 according to an example embodiment. As shown for example in FIG. 1 the secondary battery 10 comprises an electrode assembly 14, an electrolyte, and an outer can 16 that houses the electrode assembly 14 and the electrolyte. The electrode assembly 14 includes a positive electrode 11, a negative electrode 12, and separators 13, and has a winding structure in which the positive electrode 11 and the negative electrode 12 are wound in a spiral shape with the separators 13 located between the electrodes 12, 13. The outer can 16 is a bottomed cylindrical metal container having an opening on one side in the axial direction, and the opening of the outer can 16 is closed off by a sealing assembly 17. In the following, for convenience of explanation, the sealing assembly 17 side of the secondary battery 10 is described as the top, and the bottom portion side of the outer can 16 is described as the bottom.

As the electrolyte, for example, a non-aqueous electrolyte is used. The non-aqueous electrolyte contains a non-aqueous solvent and an electrolyte salt dissolved in the non-aqueous solvent. As the non-aqueous solvent, esters, ethers, nitriles, amides, and a mixed solvent containing two or more of the foregoing may for example be used. The non-aqueous solvent may contain a halogen-substituted product obtained by substituting at least a part of the hydrogens in the above solvents with halogen atoms such as fluorine. The non-aqueous electrolyte is not limited to a liquid electrolyte, and may be a solid electrolyte. As the electrolyte salt, for example, a lithium salt such as $LiPF_6$ is used.

The positive electrode 11, the negative electrode 12, and the separators 13, which constitute the electrode assembly 14, are all long strip-shaped members, and are alternately laminated in the radial direction of the electrode assembly 14 by being wound in a spiral shape. Further, the electrode assembly 14 has a positive electrode lead 20 connected to the positive electrode 11 by welding or the like, and a negative electrode lead 21 connected to the negative electrode 12 by welding or the like. The negative electrode 12 is formed to have a size somewhat larger than that of the positive electrode 11 in order to prevent precipitation of lithium. That is, the negative electrode 12 is formed longer than the positive electrode 11 in the length direction and in the width direction. The two separators 13 are formed somewhat larger than at least the positive electrode 11, and are arranged so as to, for example, sandwich the positive electrode 11.

Insulation plates 18 and 19 are respectively arranged above and below the electrode assembly 14. In the example shown in FIG. 1, the positive electrode lead 20 connected to the positive electrode 11 extends through a through hole in the insulation plate 18 and toward the sealing assembly 17, while the negative electrode lead 21 connected to the negative electrode 12 extends outside the insulation plate 19 and toward the bottom portion of the outer can 16. The positive electrode lead 20 is connected to the lower surface of an internal terminal plate 23 of the sealing assembly 17 by welding or the like, and a cap 27, which is the top plate of the sealing assembly 17 electrically connected to the internal terminal plate 23, serves as the positive electrode terminal. The negative electrode lead 21 is connected to the inner surface of the bottom portion of the outer can 16 by welding or the like, and the outer can 16 serves as the negative electrode terminal.

A gasket 28 is provided between the outer can 16 and the sealing assembly 17 so as to ensure airtightness inside the battery. The outer can 16 has formed thereon a grooved portion 22, in which a part of a side surface portion protrudes inward and supports the sealing assembly 17. The grooved portion 22 is preferably formed in an annular shape along the circumferential direction of the outer can 16, and supports the sealing assembly 17 on its upper surface. The sealing assembly 17 is fixed to an upper part of the outer can 16 by means of the grooved portion 22 and an opening end portion of the outer can 16 which is crimped to the sealing assembly 17.

The sealing assembly 17 has a structure obtained by laminating, in order from the electrode assembly 14 side, the internal terminal plate 23, a lower valve member 24, an insulation member 25, an upper valve member 26, and the cap 27. Each of the members constituting the sealing assembly 17 has, for example, a disk shape or a ring shape, and the respective members except the insulation member 25 are mutually electrically connected. The lower valve member 24 and the upper valve member 26 are connected to each other at their central portions, and the insulation member 25 is interposed between peripheral edge portions of these valve bodies. When the internal pressure of the battery increases due to abnormal heat generation, the lower valve member 24 deforms and ruptures in a manner pushing up the upper valve member 26 toward the cap 27, and the current path between the lower valve member 24 and the upper valve member 26 is thereby cut off. When the internal pressure increases further, the upper valve member 26 ruptures, and gas is discharged from an opening in the cap 27.

The positive electrode 11, the negative electrode 12, and the separators 13, which constitute the electrode assembly 14, will now be described in detail by reference to FIG. 2.

Figure 2:
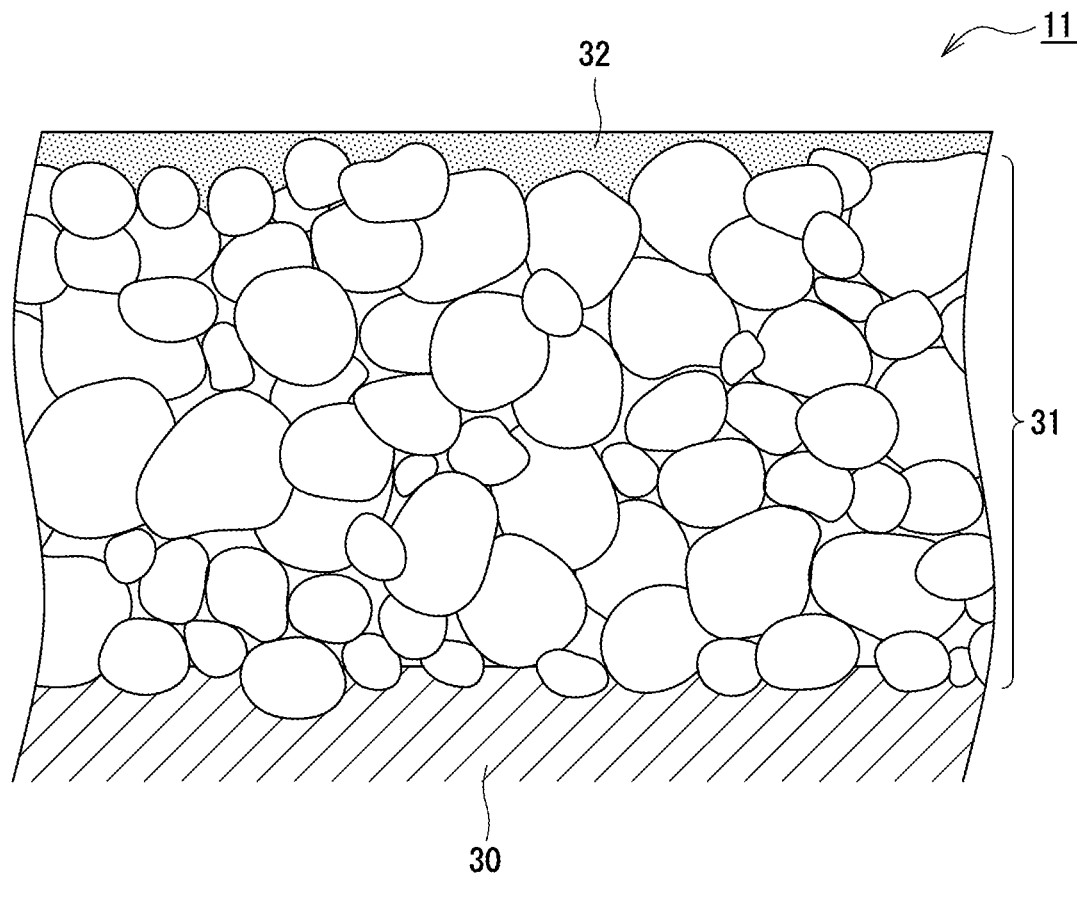
FIG. 2 is a cross-sectional view of a positive electrode according to an example embodiment.

FIG. 2 is a cross-sectional view of the positive electrode 11 according to an example embodiment.

[Positive Electrode]

As shown for example in FIG. 2, the positive electrode 11 comprises a positive electrode core 30 and a positive electrode mixture layer 31 provided on a surface of the positive electrode core 30. For the positive electrode core 30, it is possible to use: a foil of a metal that is stable in the potential range of the positive electrode 11, such as aluminum; a film having such a metal disposed on its surface layer; and the like. The thickness of the positive electrode core 30 is, for example, 10 μm to 30 μm. The positive electrode mixture layer 31 contains a positive electrode active material, a conductive agent, and a binder, and is preferably provided on both sides of the positive electrode core 30 excluding the portion to which the positive electrode lead 20 is connected.

The positive electrode mixture layer 31 is composed mainly of the positive electrode active material. The content of the positive electrode active material in the positive electrode mixture layer 31 is preferably 80% by mass or higher, and more preferably 90 to 99% by mass, relative to the mass of the positive electrode mixture layer 31. As will be described in detail further below, the positive electrode mixture layer 31 has appropriate unevenness on its surface, which reduces the internal resistance of the battery.

The positive electrode active material contained in the positive electrode mixture layer 31 is composed mainly of a lithium-containing transition metal composite oxide. Examples of metal elements contained in the lithium-containing transition metal composite oxide include Ni, Co, Mn, Al, B, Mg, Ti, V, Cr, Fe, Cu, Zn, Ga, Sr Zr, Nb, In, Sn, Ta, W and the like. An example of a preferred lithium-containing transition metal composite oxide is a composite oxide containing at least one of Ni, Co, and Mn. Specific examples include a lithium-containing transition metal composite oxide containing Ni, Co and Mn, and a lithium-containing transition metal composite oxide containing Ni, Co and Al.

The volume-based median diameter (hereinafter referred to as "D50") of the positive electrode active material is, for example, 5 μm to 30 μm, and preferably 10 μm to 25 μm. A volume-based D50 means a particle size at which, in a volume-based particle size distribution, the cumulative frequency from the smaller particle size side is 50%, and is also called a mid-level diameter. The D50 can be measured by means of a laser diffraction type particle size distribution measuring device (e.g., Microtrac HRA manufactured by Nikkiso Co., Ltd.) and by using water as a dispersion medium.

The packing density of the positive electrode active material in the positive electrode mixture layer 31 is preferably 3.2 g/cm$^3$ or higher. With such values, the energy density of the battery can be increased. Moreover, a higher packing density of the positive electrode active material leads to a more notable effect of internal resistance reduction due to the unevenness formed on the surface of the positive electrode mixture layer 31. While the upper limit value of the packing density is not particularly defined, it is, for example, 3.9 g/cm$^3$ or 3.7 g/cm$^3$.

The packing density of the positive electrode active material in the positive electrode mixture layer 31 may be calculated by: dissolving a predetermined area size of the positive electrode 11 in aqua regia; determining the amount of elements constituting the positive electrode active material by ICP emission spectrometry and thereby calculating the weight of the active material per predetermined area size; and calculating the packing density based on the average thickness of the positive electrode mixture layer 31. When the positive electrode 11 has a surface layer 32 described further below, it is necessary to further subtract the mass of the surface layer 32. The mass of the surface layer 32 can be determined using a calibration curve derived from X-ray fluorescence intensities of surface layers having known weights per unit area (or coating weights). For measuring an X-ray fluorescence of the surface layer 32, an X-ray fluorescence analyzer manufactured by Rigaku Corporation, for example, is used.

Examples of the conductive agent contained in the positive electrode mixture layer 31 include carbon materials such as carbon black, acetylene black, Ketjen black, and graphite. Among the foregoing, it is preferable to use acetylene black. The content of the conductive agent is, for example, 0.5 to 3% by mass relative to the mass of the positive electrode mixture layer 31.

Examples of the binder contained in the positive electrode mixture layer 31 include fluororesins such as polytetrafluoroethylene (PTFE) and polyvinylidene fluoride (PVdF), polyacrylonitrile (PAN), polyimides, acrylic resins, polyolefins, and so on. Among the foregoing, a fluororesin such as PVdF is preferable. These resins may be used in combination with cellulose derivatives such as carboxymethyl cellulose (CMC) or salts thereof, polyethylene oxide (PEO), and the like. The content of the binder is, for example, 0.5 to 3% by mass relative to the mass of the positive electrode mixture layer 31.

The positive electrode mixture layer 31 preferably has a layer thickness variation coefficient of 0.01 to 0.30. Here, the thickness variation coefficient of the positive electrode mixture layer 31 is a value obtained by dividing the standard deviation of the thickness of the positive electrode mixture layer 31 by the average thickness value, and is an index indicating the variation of thickness with respect to the average thickness. Since a part of the constituent material of the positive electrode mixture layer 31 is embedded in the positive electrode core 30, unevenness is present at the interface between the positive electrode core 30 and the positive electrode mixture layer 31, but this unevenness is less than the unevenness formed on the surface of the positive electrode mixture layer 31. Accordingly, the thickness variation coefficient of the positive electrode mixture layer 31 serves as an index indicating the degree of unevenness on the surface of the positive electrode mixture layer 31, and a greater variation coefficient signifies a greater surface unevenness.

The average thickness of the positive electrode mixture layer 31 on one side of the positive electrode core 30 is, for example, 30 μm to 100 μm, preferably 40 μm to 90 μm, and more preferably 50 μm to 80 μm. The positive electrode mixture layer 31 is generally provided on both sides of the positive electrode core 30 with substantially the same thickness. The thickness variation coefficient of the positive electrode mixture layer 31 is more preferably 0.015 or greater, and particularly preferably 0.020 or greater. The upper limit value of the variation coefficient is more preferably 0.28, and particularly preferably 0.25. When the upper limit value exceeds 0.30, the surface unevenness of the positive electrode mixture layer 31 becomes too great so that the cycle characteristics deteriorate due to, for example, non-uniformity of the battery reaction.

For measuring the average thickness of the positive electrode mixture layer 31, an electron micrograph of a positive electrode cross-section is used, in which a length range of 160 μm or greater can be observed in the length direction of the positive electrode 11. A specific measurement method will be described below by reference to FIG. 3.

Figure 3:
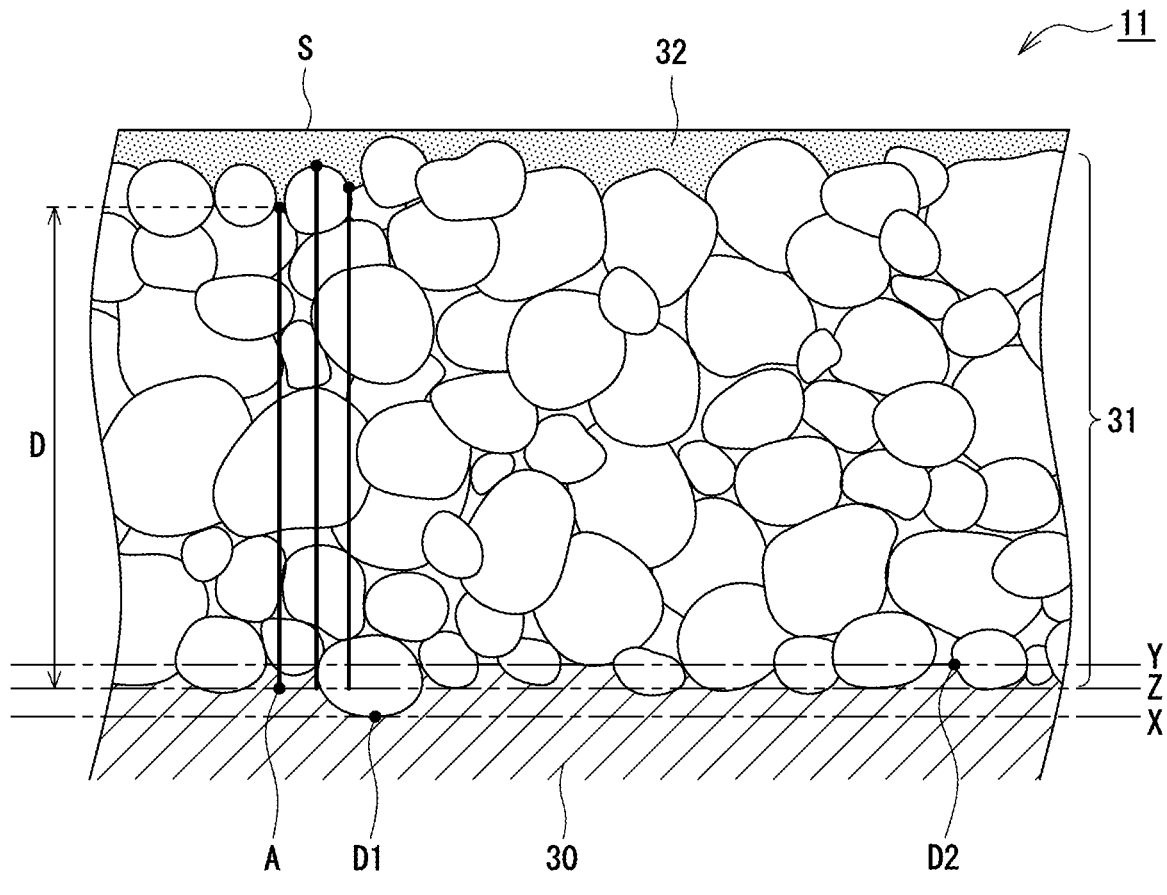
FIG. 3 is a diagram for demonstrating a method of measuring an average thickness of a positive electrode mixture layer in the positive electrode according to an example embodiment.

(1) As shown in FIG. 3, in the thickness direction of the positive electrode mixture layer 31, determine the deepest point (D1) and the shallowest point (D2) at the contact portion between the positive electrode active material and the positive electrode core 30.

(2) Draw a straight line X passing through the deepest point D1 and extending parallel to the outermost surface S of the positive electrode 11 (i.e., the outermost surface of the surface layer 32), and a straight line Y passing through the shallowest point D2 and extending parallel to the outermost surface of the positive electrode 11. Then draw a reference line Z extending along the exactly middle position between the straight lines X and Y and extending parallel to the outermost surface of the positive electrode 11.

(3) Draw a perpendicular line in the thickness direction of the positive electrode mixture layer 31 from an arbitrary position A on the reference line Z, and measure a length D from the reference line Z to the surface of the positive electrode mixture layer 31 (i.e., the interface between the positive electrode mixture layer 31 and the surface layer 32) as a thickness of the positive electrode mixture layer 31.

(4) Measure the length D at respective points located at intervals of 4 μm from the position A on the reference line Z, and average those lengths D measured at 40 points to obtain the average thickness of the positive electrode mixture layer 31. Further, the standard deviation and the variation coefficient of the thickness of the positive electrode mixture layer 31 are calculated based on the average thickness.

There are cases in which the surface layer 32 is not provided on the positive electrode 11 and the outermost surface S of the positive electrode 11 has unevenness resulting from the shape of the active material, so that difficulties exist in drawing the straight line X parallel to the outermost surface S of the positive electrode 11 (i.e., the outermost surface of the surface layer 32). In such a case, as shown in FIG. 4, a straight line X' is drawn according to the following procedure, then a straight line X is drawn parallel to the straight line X', and the variation coefficient and the like can be obtained based on this straight line X.

(1) Select twenty active material particles located on the surface of the positive electrode 11, which is located on a side opposite to the positive electrode core 30.

Figure 4:
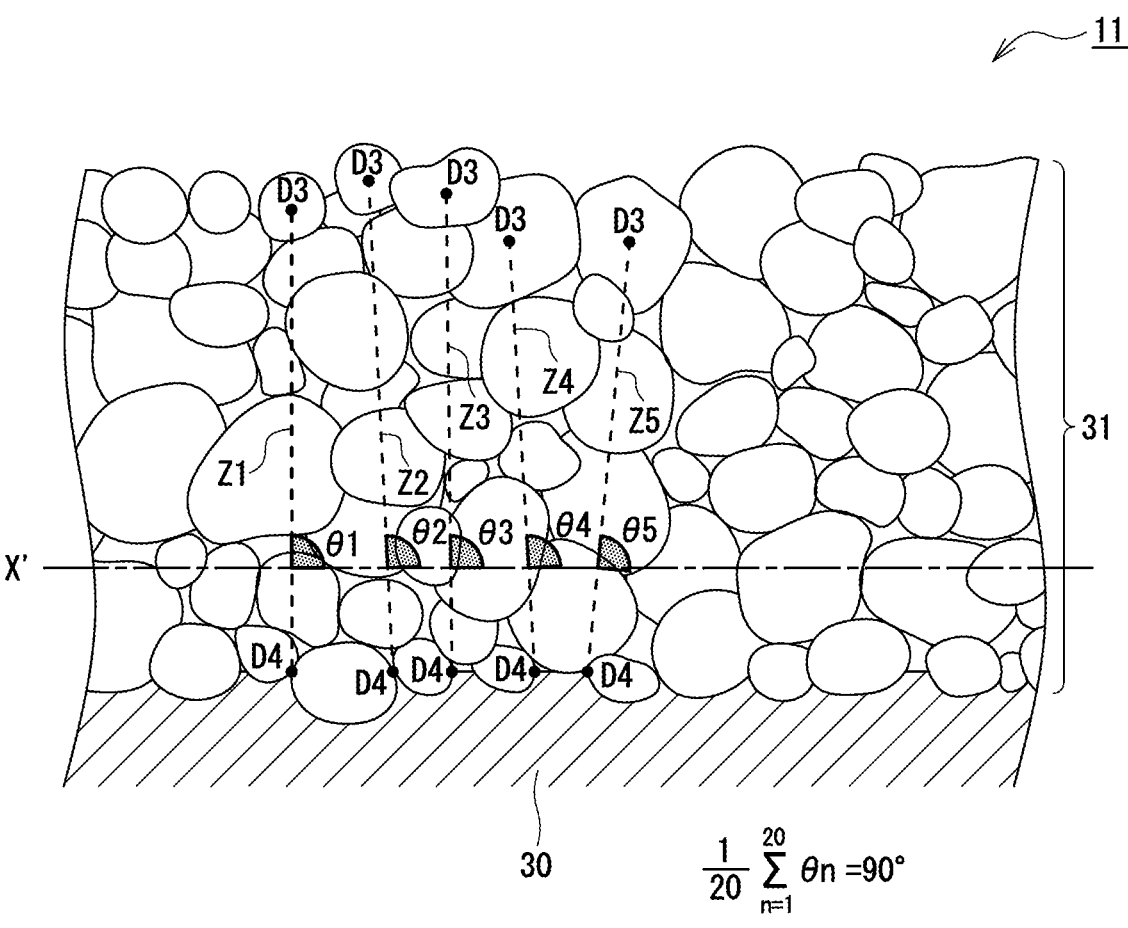
FIG. 4 is a diagram for demonstrating a method of measuring an average thickness of a positive electrode mixture layer in the positive electrode according to an example embodiment.

(2) For each of the particles, determine the center of the particle (point D3) and a point (D4) on the surface of the positive electrode core 30 located at the shortest distance from the point D3, and draw straight lines Z1 to Z20 (Z1 to Z5 are shown in FIG. 4) passing through the pairs of points D3 and D4.

(3) Determine a straight line X' whose average angle of intersection with the straight lines Z1 to Z20 is 90 degrees.

The surface tortuosity factor of the positive electrode mixture layer 31 is preferably 1.2 to 2.0. Here, the surface tortuosity factor of the positive electrode mixture layer 31 denotes, regarding a length range between two arbitrary points on the outermost surface of the positive electrode mixture layer 31, a value obtained by dividing the length measured along the surface of the positive electrode mixture layer 31 by a length of a straight line parallel to the surface of the positive electrode 11, and serves as an index indicating the degree of unevenness on the surface of the positive electrode mixture layer 31. A greater tortuosity factor signifies a greater surface unevenness. The surface tortuosity factor of the positive electrode mixture layer 31 is more preferably 1.25 or greater, and particularly preferably 1.30 or greater. The upper limit value of the tortuosity factor is more preferably 1.95, and particularly preferably 1.90.

For measuring the surface tortuosity factor of the positive electrode mixture layer 31, it is possible to use the electron micrograph of the cross-section of the positive electrode 11 used for measuring the average thickness. Specifically, in the 160-μm length range of the reference line Z, the length (L)

along the surface of the positive electrode mixture layer 31 is measured, and the tortuosity factor is calculated by the formula L μm/160 μm.

The positive electrode mixture layer 31 has, for example, a layer thickness variation coefficient of 0.01 to 0.30 and a layer surface tortuosity factor of 1.2 to 2.0. When the layer thickness variation coefficient and the like of the positive electrode mixture layer 31 are within the above-noted ranges, it is considered that appropriate surface unevenness is formed on the positive electrode mixture layer 31 so that the reaction resistance becomes reduced, and the internal resistance can be reduced without affecting other battery performance features. In other words, the surface of the positive electrode mixture layer 31 has unevenness formed thereon that satisfies the above-described variation coefficient and tortuosity factor.

The positive electrode mixture layer 31 is formed by, for example, applying a positive electrode mixture slurry containing the positive electrode active material, the conductive agent, the binder, and the like to a surface of the positive electrode core 30, and then drying the applied film. Generally, the applied film of the positive electrode mixture layer 31 is compressed in order to increase the packing density of the positive electrode active material, but if the applied film is simply compressed, the surface of the mixture layer becomes flat, so that surface unevenness that satisfies the above-noted variation coefficient and tortuosity factor would not be formed. An example method of forming desired unevenness on the surface of the positive electrode mixture layer 31 is a method in which an applied film of the surface layer 32 is formed on the applied film of the positive electrode mixture layer 31, and subsequently the positive electrode mixture layer 31 and the surface layer 32 are compressed. Since the applied film of the positive electrode mixture layer 31 before compression has surface unevenness, by compressing the positive electrode mixture layer 31 together with the surface layer 32 instead of compressing the positive electrode mixture layer 31 alone, the unevenness of the applied film is allowed to remain on the surface of positive electrode mixture layer 31.

The positive electrode 11 may have the surface layer 32 provided on the surface of the positive electrode mixture layer 31. A preferred surface layer 32 is composed mainly of an inorganic compound, has lower conductivity than the positive electrode mixture layer 31, and is more preferably an insulation layer. The surface layer 32 may be removed after the compression step, but is preferably not removed and allowed to remain on the surface of the positive electrode mixture layer 31 in consideration of reduction of manufacturing costs, suppression of internal short circuits, suppression of heat generation upon occurrence of short circuits, and the like resulting from not performing the removal step.

The surface layer 32 covers the entire surface of the positive electrode mixture layer 31 and constitutes the outermost surface layer of the positive electrode 11. The surface layer 32 contains, for example, an inorganic compound and a binder, and its surface (i.e., the outermost surface S of the positive electrode 11) is substantially flat. Accordingly, the surface tortuosity factor of the surface layer 32 is small, and is, for example, less than 1.2. On the other hand, at the interface between the surface layer 32 and the positive electrode mixture layer 31, unevenness resulting from the unevenness on the surface of the positive electrode mixture layer 31 is formed.

The inorganic compound contained in the surface layer 32 is a compound in which Li insertion/extraction does not occur due to solid-phase redox reaction at a potential of 2.5 V or higher (with respect to Li/Li+), and which does not function as a positive electrode active material. The inorganic compound is, for example, at least one of an oxide, hydroxide, oxyhydroxide, borate, phosphate, and sulfate that contains at least one metal element selected from Al, Sn, W, Nb, Mo, Si, and Ba. The content of the inorganic compound in the surface layer 32 is preferably 80% by mass or higher, and more preferably 90 to 99% by mass, relative to the mass of the surface layer 32.

Specific examples of the inorganic compound include: oxides such as titanium oxide ($TiO_2$), aluminum oxide ($Al_2O_3$), tin oxide ($SnO_2$), tungsten oxide ($WO_3$), niobium oxide ($Nb_2O_5$), molybdenum oxide ($MoO_3$), and silicon oxide ($SiO_2$); hydroxides such as magnesium hydroxide ($Mg(OH)_2$); oxyhydroxides such as boehmite ($AlOOH$); phosphates such as lithium phosphate ($Li_3PO_4$); and sulfates such as barium sulfate ($BaSO_4$). Among the foregoing, titanium oxide ($TiO_2$) and boehmite ($AlOOH$) are preferable. The volume-based D50 of the inorganic compound is preferably 0.05 μm to 1 μm, and more preferably 0.1 μm to 0.8 μm. With such values, the porosity and pore size of the surface layer 32 can be easily adjusted to within desired ranges.

As the binder contained in the surface layer 32, the same type of binder as the binder used for the positive electrode mixture layer 31 can be used, which may be a fluororesin such as PTFE or PVdF, PAN, polyimide, acrylic resin, polyolefin, or the like. The content of the binder is, for example, 0.5 to 3% by mass relative to the mass of the surface layer 32.

The average thickness of the surface layer 32 is preferably less than the average thickness of the positive electrode mixture layer 31. Specifically, the average thickness of the surface layer 32 on one side of the positive electrode core 30 is 0.1 μm to 10 μm, preferably 0.5 μm to 9 μm, and more preferably 1 μm to 8 μm. When the thickness of the surface layer 32 is too small, it becomes difficult to maintain the surface unevenness of the positive electrode mixture layer 31 in the positive electrode 11 compression step. Further, the thickness variation coefficient of the surface layer 32 (i.e., standard deviation of thickness/average thickness) is, for example, 0.3 or greater. The average thickness of the surface layer 32 is measured by a method similar to that used for the average thickness of the positive electrode mixture layer 31.

The surface layer 32 is a porous layer, and does not impede penetration of the electrolyte. The porosity of the surface layer 32 is, for example, 25 to 55%, and is preferably 30 to 45% in consideration of reducing the internal resistance, suppressing heat generation upon occurrence of internal short circuits, and the like. The porosity of the surface layer 32 is measured by the following method.

(1) Using a calibration curve derived from X-ray fluorescence intensities of surface layers having known weights per unit area (or coating weights), determine the weight per unit area of the inorganic compound particles contained in the surface layer 32 based on the X-ray fluorescence intensity.

(2) Calculate the true volume (Vt) of the inorganic compound particles based on the true density and weight per unit area of the inorganic compound particles.

(3) Calculate the apparent volume (Va) of the surface layer 32 based on the area and average thickness of the surface layer 32.

(4) Calculate the porosity (P) of the surface layer 32 by the following formula:

$$P = 100 - 100 Vt/Va$$

[Negative Electrode]

The negative electrode 12 comprises a negative electrode core and a negative electrode mixture layer provided on a surface of the negative electrode core. For the negative electrode core, it is possible to use: a foil of a metal that is stable in the potential range of the negative electrode 12, such as copper; a film having such a metal disposed on its surface layer; and the like. The thickness of the negative electrode core is, for example, 5 μm to 25 μm. The negative electrode mixture layer contains a negative electrode active material and a binder, and is preferably provided, for example, on both sides of the negative electrode core excluding the portion to which the negative electrode lead 21 is connected.

As the negative electrode active material, the negative electrode mixture layer contains, for example, a carbon-based active material that reversibly occludes and releases lithium ions. Preferred carbon-based active materials are graphite including natural graphite such as scaly graphite, massive graphite, and earthy graphite, and artificial graphite such as massive artificial graphite (MAG) and graphitized mesophase carbon microbeads (MCMB). Further, as the negative electrode active material, a Si-based active material composed of at least one of Si and a Si-containing compound may be used. A carbon-based active material and a Si-based active material may be used in combination.

The volume-based D50 of the negative electrode active material is, for example, 5 μm to 30 μm, and preferably 10 μm to 25 μm. The packing density of the negative electrode active material in the negative electrode mixture layer is preferably 1.2 g/cm³ or higher. With such values, the energy density of the battery can be increased. Further, when unevenness is formed on the surface of the negative electrode mixture layer, a higher packing density of the negative electrode active material leads to a more notable effect of internal resistance reduction due to the surface unevenness of the negative electrode mixture layer. While the upper limit value of the packing density is not particularly defined, it is, for example, 2.0 g/cm³ or 1.7 g/cm³.

As the binder contained in the negative electrode mixture layer, fluororesins, PAN, polyimides, acrylic resins, polyolefins and the like can be used as with the positive electrode 11, but styrene-butadiene rubber (SBR) is preferably used. Further, the negative electrode mixture layer preferably additionally contains CMC or a salt thereof, polyacrylic acid (PAA) or a salt thereof, polyvinyl alcohol (PVA), or the like. Among the foregoing, use of SBR in combination with CMC or a salt thereof or PAA or a salt thereof is preferred.

Similar to the positive electrode mixture layer 31, the negative electrode mixture layer may have appropriate unevenness on the surface, and may have a layer thickness variation coefficient (standard deviation of thickness/average thickness) of 0.01 to 0.30. The variation coefficient is more preferably 0.015 or greater, and particularly preferably 0.020 or greater. The upper limit value of the variation coefficient is more preferably 0.28, and particularly preferably 0.25. The average thickness of the negative electrode mixture layer on one side of the negative electrode core is, for example, 30 μm to 100 μm, preferably 40 μm to 90 μm, and more preferably 50 μm to 80 μm. The average thickness of the negative electrode mixture layer is measured by the same method as that used for the average thickness of the positive electrode mixture layer 31.

The negative electrode mixture layer may have a layer surface tortuosity factor of 1.2 to 2.0. The tortuosity factor is more preferably 1.25 or greater, and particularly preferably 1.30 or greater. The upper limit value of the tortuosity factor is more preferably 1.95, and particularly preferably 1.90. The negative electrode mixture layer has, for example, a layer thickness variation coefficient of 0.01 to 0.30 and a layer surface tortuosity factor of 1.2 to 2.0. In other words, the surface of the negative electrode mixture layer has unevenness formed thereon that satisfies the above-described variation coefficient and tortuosity factor. The tortuosity factor of the negative electrode mixture layer is measured by the same method as that used for the tortuosity factor of the positive electrode mixture layer 31.

The negative electrode 12 may have a surface layer provided on the surface of the negative electrode mixture layer. The surface layer of the negative electrode 12 is composed of a material similar to that of the surface layer 32 described above, and also has similar thickness and porosity. The surface layer may be removed after the unevenness is formed on the surface of the negative electrode mixture layer, but is preferably allowed to remain on the surface of the negative electrode mixture layer. The negative electrode 12 is manufactured by, for example, forming an applied film of the surface layer on an applied film of the negative electrode mixture layer, and subsequently compressing the negative electrode mixture layer together with the surface layer.

[Separator]

As the separator 13, a porous sheet having ion permeability and insulating property is used. Specific examples of the porous sheet include a microporous thin film, a woven fabric, and a non-woven fabric. As the material of the separator 13, olefin resins such as polyethylene and polypropylene, cellulose, and the like are preferred. The separator 13 may have either a single-layer structure or a laminated structure. A heat-resistant layer or the like may be formed on the surface of the separator 13.

EXAMPLES

While the present disclosure will now be described in more detail using Examples, the present disclosure is not limited to these Examples.

Example 1

[Preparation of Positive Electrode]

As the positive electrode active material, a lithium-containing transition metal composite oxide represented by $Ni_{0.88}Co_{0.09}Al_{0.03}O_2$ (volume-based D50: 10 μm) was used. A positive electrode mixture slurry was prepared by mixing 100 parts by mass of the positive electrode active material, 1 part by mass of acetylene black, and 1 part by mass of polyvinylidene fluoride, and by using N-methyl-2-pyrrolidone (NMP) as the dispersion medium. Next, the positive electrode mixture slurry was applied to both sides of a positive electrode core made of aluminum foil at an amount of 0.028 g/cm² per side, and the applied films were dried to form positive electrode mixture layers on both sides of the positive electrode core.

As the inorganic compound constituting the surface layer, titanium oxide (volume-based D50: 0.2 μm) was used. A slurry for forming the surface layer was prepared by mixing 100 parts by mass of titanium oxide and 3 parts by mass of polyvinylidene fluoride, and by using NMP as the dispersion medium. Next, the slurry was applied to the surfaces of the positive electrode mixture layers to form surface layers on the surfaces of the positive electrode mixture layers. Subsequently, the positive electrode mixture layers and the surface layers were compressed using a roll press. A positive electrode having a positive electrode mixture layer and a surface layer formed in that order on both sides of the positive electrode core was thereby obtained.

In the positive electrode mixture layer, the density was 3.2 $g/cm^3$, the average thickness was 60 μm, and the thickness variation coefficient (standard deviation of thickness/average thickness) was 0.029. In the surface layer, the average thickness was 2.5 μm, and the thickness variation coefficient was 0.696. These measurement results are shown in Table 1 below, together with the inorganic compound constituting the surface layer and a result of evaluation of the battery internal resistance. The methods for measuring the average thickness and density of each layer are as described above.

[Preparation of Negative Electrode]

As the negative electrode active material, graphite powder was used. A negative electrode mixture slurry was prepared by mixing 98.7 parts by mass of the negative electrode active material, 0.7 parts by mass of carboxymethyl cellulose (CMC), and 0.6 parts by mass of styrene-butadiene rubber (SBR), and by using water as the dispersion medium. Next, the negative electrode mixture slurry was applied to both sides of a negative electrode core made of copper foil at an amount of $0.013 \ g/cm^2$ per side. The applied films were dried and compressed, and the product was cut into a predetermined electrode size. A negative electrode having negative electrode mixture layers formed on both sides of the negative electrode core was thereby obtained.

[Preparation of Non-Aqueous Electrolyte Solution]

Ethylene carbonate (EC), ethyl methyl carbonate (EMC), and dimethyl carbonate (DMC) were mixed in a volume ratio of 3:3:4. A non-aqueous electrolyte solution was prepared by dissolving $LiPF_6$ into this mixed solvent so as to attain a concentration of 1.2 mol/L.

[Preparation of Secondary Battery]

An aluminum lead was attached to the above-noted positive electrode, and a nickel lead was attached to the above-noted negative electrode. The positive and negative electrodes were wound with a polyethylene separator having a thickness of 14 μm located between the electrodes, to thereby prepare a spiral-type electrode assembly. The electrode assembly was placed in a bottomed cylindrical outer can having an outer diameter of 18.2 mm and a height of 65 mm. The non-aqueous electrolyte solution was injected therein, and then the opening of the outer can was sealed with a gasket and a sealing assembly. A 18650-type cylindrical non-aqueous electrolyte secondary battery was thereby obtained.

Examples 2 to 7

A positive electrode and a non-aqueous electrolyte secondary battery were obtained in the same manner as in Example 1 except that, instead of titanium oxide, the compound shown in Table 1 was used as the inorganic compound constituting the surface layer.

Comparative Example 1

A positive electrode and a non-aqueous electrolyte secondary battery were obtained in the same manner as in Example 1 except that, in preparing the positive electrode, the positive electrode mixture layer was compressed, then the slurry for forming the surface layer was applied to the surface of the compressed positive electrode mixture layer, and subsequently the surface layer was compressed.

Comparative Example 2

A positive electrode and a non-aqueous electrolyte secondary battery were obtained in the same manner as in Example 1 except that, in preparing the positive electrode, the surface layer was not formed.

Example 8

A positive electrode and a non-aqueous electrolyte secondary battery were obtained in the same manner as in Example 1 except that, in preparing the positive electrode, the applied amount of slurry and the pressure during compression of the applied films were changed, so that a positive electrode mixture layer density of 3.5 $g/cm^3$ and a surface layer thickness of 4 μm were attained. The measurement results such as the thickness of each layer are shown in Table 2 below, together with the inorganic compound constituting the surface layer and a result of evaluation of the battery internal resistance.

Examples 9 and 10

A positive electrode and a non-aqueous electrolyte secondary battery were obtained in the same manner as in Example 8 except that the thickness of the surface layer was set to the thickness value shown in Table 2.

Example 11

In preparing a positive electrode, a slurry for forming the surface layer was prepared by mixing 100 parts by mass of boehmite (AlOOH; average particle size: 0.5 μm) and 3 parts by mass of acrylic resin, and by using water as the dispersion medium. Next, the slurry was applied to the surfaces of the positive electrode mixture layers at an amount of $8 \ g/m^2$, and the applied films were dried to form surface layers on the surfaces of the positive electrode mixture layers. After compressing the positive electrode mixture layers and the surface layers using a roll press, the surface layers were removed by immersing the electrode plate in water and performing ultrasonication. A positive electrode having only the positive electrode mixture layers formed on both sides of the positive electrode core was thereby obtained. Regarding points other than the above, a non-aqueous electrolyte secondary battery was obtained in the same manner as in Example 8.

Comparative Example 3

A positive electrode and a non-aqueous electrolyte secondary battery were obtained in the same manner as in Example 8 except that, in preparing the positive electrode, the surface layer was not formed.

Example 12

A positive electrode and a non-aqueous electrolyte secondary battery were obtained in the same manner as in Example 2 except that, in preparing the positive electrode, the applied amount of slurry and the pressure during compression of the applied films were changed, so that a positive electrode mixture layer density of 3.7 $g/cm^3$ was attained. The measurement results such as the thickness of each layer are shown in Table 3 below, together with the inorganic compound constituting the surface layer and a result of evaluation of the battery internal resistance.

Examples 13 and 14

A positive electrode and a non-aqueous electrolyte secondary battery were obtained in the same manner as in Example 12 except that, in preparing the positive electrode, the solid content of the slurry was adjusted.

Comparative Example 4

A positive electrode and a non-aqueous electrolyte secondary battery were obtained in the same manner as in Example 12 except that, in preparing the positive electrode, the surface layer was not formed.

Example 15

A non-aqueous electrolyte secondary battery was obtained in the same manner as in Example 1 except that the positive electrode and the negative electrode were prepared by the following methods.
[Preparation of Positive Electrode]
As the positive electrode active material, a lithium-containing transition metal composite oxide (volume-based D50: 10 μm) represented by $Ni_{0.88}Co_{0.09}Al_{0.03}O_2$ was used. A positive electrode mixture slurry was prepared by mixing 100 parts by mass of the positive electrode active material, 1 part by mass of acetylene black, and 1 part by mass of polyvinylidene fluoride, and by using N-methyl-2-pyrrolidone (NMP) as the dispersion medium. Next, the positive electrode mixture slurry was applied to both sides of a positive electrode core made of aluminum foil at an amount of 0.028 $g/cm^2$ per side. The applied films were dried and compressed, and the product was cut into a predetermined electrode size. A positive electrode having positive electrode mixture layers formed on both sides of the positive electrode core was thereby obtained.
[Preparation of Negative Electrode]
As the negative electrode active material, graphite powder was used. A negative electrode mixture slurry was prepared by mixing 98.7 parts by mass of the negative electrode active material, 0.7 parts by mass of carboxymethyl cellulose (CMC), and 0.6 parts by mass of styrene-butadiene rubber (SBR), and by using water as the dispersion medium. Next, the negative electrode mixture slurry was applied to both sides of a negative electrode core made of copper foil at an amount of 0.013 $g/cm^2$ per side, and the applied films were dried to form negative electrode mixture layers on both sides of the negative electrode core.
As the inorganic compound constituting the surface layer, titanium oxide (volume-based D50: 0.5 μm) was used. A slurry for forming the surface layer was prepared by mixing 100 parts by mass of titanium oxide and 3 parts by mass of acrylic resin, and by using water as the dispersion medium. Next, the slurry was applied to the surfaces of the negative electrode mixture layers at an amount of 8 $g/m^2$, and the applied films were dried to form surface layers on the surfaces of the negative electrode mixture layers. Subsequently, the negative electrode mixture layers and the surface layers were compressed using a roll press. A negative electrode having a negative electrode mixture layer and a surface layer formed in that order on both sides of the negative electrode core was thereby obtained.

In the negative electrode mixture layer, the density was 1.2 $g/cm^3$, the average thickness was 66 μm, and the thickness variation coefficient was 0.029. In the surface layer, the average thickness was 2.5 μm, and the thickness variation coefficient was 0.766. These measurement results are shown in Table 4 below, together with the inorganic compound constituting the surface layer and a result of evaluation of the battery internal resistance.

Examples 16 to 21

A negative electrode and a non-aqueous electrolyte secondary battery were obtained in the same manner as in Example 15 except that, instead of titanium oxide, the compound shown in Table 4 was used as the inorganic compound constituting the surface layer.

Comparative Example 5

A negative electrode and a non-aqueous electrolyte secondary battery were obtained in the same manner as in Example 15 except that, in preparing the negative electrode, the negative electrode mixture layer was compressed, then the slurry for forming the surface layer was applied to the surface of the compressed negative electrode mixture layer, and subsequently the surface layer was compressed.

Comparative Example 6

A negative electrode and a non-aqueous electrolyte secondary battery were obtained in the same manner as in Example 15 except that, in preparing the negative electrode, the surface layer was not formed.

Example 22

A negative electrode and a non-aqueous electrolyte secondary battery were obtained in the same manner as in Example 16 except that, in preparing the negative electrode, the applied amount of slurry and the pressure during compression of the applied films were changed, so that a negative electrode mixture layer density of 1.5 $g/cm^3$ was attained. The measurement results such as the thickness of each layer are shown in Table 5 below, together with the inorganic compound constituting the surface layer and a result of evaluation of the battery internal resistance.

Examples 23 and 24

A negative electrode and a non-aqueous electrolyte secondary battery were obtained in the same manner as in Example 22 except that, in preparing the negative electrode, the solid content of the slurry was adjusted.

Comparative Example 7

A negative electrode and a non-aqueous electrolyte secondary battery were obtained in the same manner as in Example 22 except that, in preparing the negative electrode, the surface layer was not formed.

Example 25

A negative electrode and a non-aqueous electrolyte secondary battery were obtained in the same manner as in Example 15 except that, in preparing the negative electrode, the applied amount of slurry and the pressure during compression of the applied films were changed, so that a negative electrode mixture layer density of 1.7 g/cm$^3$ and a surface layer thickness of 4.2 μm were attained. The measurement results such as the thickness of each layer are shown in Table 6 below, together with the inorganic compound constituting the surface layer and a result of evaluation of the battery internal resistance.

Examples 26 and 27

A negative electrode and a non-aqueous electrolyte secondary battery were obtained in the same manner as in Example 25 except that the thickness of the surface layer was set to the thickness value shown in Table 2.

Example 28

In preparing a negative electrode, a slurry for forming the surface layer was prepared by mixing 100 parts by mass of boehmite (AlOOH; volume-based D50: 0.5 μm) and 3 parts by mass of acrylic resin, and by using water as the dispersion medium. Next, the slurry was applied to the surfaces of the negative electrode mixture layers at an amount of 8 g/m$^2$, and the applied films were dried to form surface layers on the surfaces of the negative electrode mixture layers. After compressing the negative electrode mixture layers and the surface layers using a roll press, the surface layers were removed by immersing the electrode plate in water and performing ultrasonication. A negative electrode having only the negative electrode mixture layers formed on both sides of the negative electrode core was thereby obtained. Regarding points other than the above, a non-aqueous electrolyte secondary battery was obtained in the same manner as in Example 25.

Comparative Example 8

A negative electrode and a non-aqueous electrolyte secondary battery were obtained in the same manner as in Example 25 except that, in preparing the negative electrode, the surface layer was not formed.

<Evaluation of Internal Resistance>

Each of the batteries of the Examples and the Comparative Examples was charged with a constant current of 1000 mA to a final charge voltage of 4.2 V, and then charged with a constant voltage of 4.2 V for 60 minutes. Next, the resistance between the terminals of the battery was measured using a low-resistance meter (by the AC 4-terminal method in which the measurement frequency was set to 1 kHz). The internal resistance value of each Example is a relative value obtained by assuming that the value measured for the battery of a corresponding Comparative Example is 100.

TABLE 1

| | Surface Layer | | | Positive Electrode Mixture Layer | | | | |
|---|---|---|---|---|---|---|---|---|
| | Inorganic Compound | Average Thickness μm | Variation Coefficient | Density g/cm$^3$ | Average Thickness μm | Variation Coefficient | Tortuosity Ratio | Internal Resistance % |
| Example 1 | TiO$_2$ | 2.5 | 0.696 | 3.2 | 60 | 0.029 | 1.47 | 97.0 |
| Example 2 | AlOOH | 2.5 | 0.683 | 3.2 | 61 | 0.028 | 1.42 | 97.2 |
| Example 3 | SnO$_2$ | 2.5 | 0.732 | 3.2 | 61 | 0.030 | 1.52 | 99.5 |
| Example 4 | WO$_3$ | 2.5 | 0.661 | 3.2 | 59 | 0.028 | 1.42 | 99.0 |
| Example 5 | Nb$_2$O$_5$ | 2.5 | 0.744 | 3.2 | 60 | 0.031 | 1.57 | 99.6 |
| Example 6 | MoO$_3$ | 2.5 | 0.792 | 3.2 | 60 | 0.033 | 1.67 | 99.1 |
| Example 7 | SiO$_2$ | 2.5 | 0.708 | 3.2 | 61 | 0.029 | 1.47 | 99.3 |
| Comparative Example 1 | TiO$_2$ | 2.5 | 0.120 | 3.2 | 60 | 0.005 | 1.10 | 100.5 |
| Comparative Example 2 | — | — | — | 3.2 | 60 | 0.003 | 1.10 | 100 |

TABLE 2

| | Surface Layer | | | Positive Electrode Mixture Layer | | | | |
|---|---|---|---|---|---|---|---|---|
| | Inorganic Compound | Average Thickness μm | Variation Coefficient | Density g/cm$^3$ | Average Thickness μm | Variation Coefficient | Tortuosity Ratio | Internal Resistance % |
| Example 8 | TiO$_2$ | 4.0 | 0.510 | 3.5 | 60 | 0.034 | 1.75 | 96.9 |
| Example 9 | TiO$_2$ | 2.5 | 0.708 | 3.5 | 61 | 0.029 | 1.49 | 96.0 |
| Example 10 | TiO$_2$ | 1.5 | 0.840 | 3.5 | 60 | 0.021 | 1.08 | 96.0 |
| Example 11 | Surface Layer Removed | | | 3.5 | 60 | 0.029 | 1.49 | 95.5 |
| Comparative Example 3 | — | — | — | 3.5 | 60 | 0.003 | 1.09 | 100 |

TABLE 3

| | Surface Layer | | | Positive Electrode Mixture Layer | | | | |
|---|---|---|---|---|---|---|---|---|
| | Inorganic Compound | Average Thickness μm | Variation Coefficient | Density g/cm$^3$ | Average Thickness μm | Variation Coefficient | Tortuosity Ratio | Internal Resistance % |
| Example 12 | AlOOH | 2.5 | 0.672 | 3.7 | 60 | 0.028 | 0.028 | 96.8 |
| Example 13 | AlOOH | 7.5 | 0.768 | 3.7 | 60 | 0.032 | 0.032 | 96.1 |

TABLE 3-continued

| | Surface Layer | | | Positive Electrode Mixture Layer | | | |
|---|---|---|---|---|---|---|---|
| | Inorganic Compound | Average Thickness μm | Variation Coefficient | Density g/cm³ | Average Thickness μm | Variation Coefficient | Tortuosity Ratio | Internal Resistance % |
| Example 14 | AlOOH | 2.5 | 0.944 | 3.7 | 59 | 0.040 | 0.04 | 93.5 |
| Comparative Example 4 | — | — | — | 3.7 | 60 | 0.003 | 0.003 | 100 |

TABLE 4

| | Surface Layer | | | Negative Electrode Mixture Layer | | | |
|---|---|---|---|---|---|---|---|
| | Inorganic Compound | Average Thickness μm | Variation Coefficient | Density g/cm³ | Average Thickness μm | Variation Coefficient | Tortuosity Ratio | Internal Resistance % |
| Example 15 | TiO$_2$ | 2.5 | 0.766 | 1.2 | 66 | 0.029 | 1.47 | 97.3 |
| Example 16 | AlOOH | 2.5 | 0.780 | 1.2 | 65 | 0.030 | 1.52 | 97.8 |
| Example 17 | SnO$_2$ | 2.5 | 0.660 | 1.2 | 66 | 0.025 | 1.27 | 99.3 |
| Example 18 | WO$_3$ | 2.5 | 0.806 | 1.2 | 65 | 0.031 | 1.57 | 99.1 |
| Example 19 | Nb$_2$O$_5$ | 2.5 | 0.754 | 1.2 | 65 | 0.029 | 1.47 | 99.5 |
| Example 20 | MoO$_3$ | 2.5 | 0.643 | 1.2 | 67 | 0.024 | 1.22 | 99.3 |
| Example 21 | SiO$_2$ | 2.5 | 0.739 | 1.2 | 66 | 0.028 | 1.42 | 99.4 |
| Comparative Example 5 | TiO$_2$ | 2.5 | 0.132 | 1.2 | 66 | 0.005 | 1.11 | 100.5 |
| Comparative Example 6 | — | — | — | 1.2 | 66 | 0.004 | 1.12 | 100 |

TABLE 5

| | Surface Layer | | | Negative Electrode Mixture Layer | | | |
|---|---|---|---|---|---|---|---|
| | Inorganic Compound | Average Thickness μm | Variation Coefficient | Density g/cm³ | Average Thickness μm | Variation Coefficient | Tortuosity Ratio | Internal Resistance % |
| Example 22 | AlOOH | 2.5 | 0.554 | 1.5 | 66 | 0.021 | 1.51 | 97.0 |
| Example 23 | AlOOH | 7.5 | 0.766 | 1.5 | 66 | 0.029 | 1.72 | 96.2 |
| Example 24 | AlOOH | 2.5 | 0.911 | 1.5 | 67 | 0.034 | 1.81 | 95.4 |
| Comparative Example 7 | — | — | — | 1.5 | 66 | 0.004 | 1.09 | 100 |

TABLE 6

| | Surface Layer | | | Positive Electrode Mixture Layer | | | |
|---|---|---|---|---|---|---|---|
| | Inorganic Compound | Average Thickness μm | Variation Coefficient | Density g/cm³ | Average Thickness μm | Variation Coefficient | Tortuosity Ratio | Internal Resistance % |
| Example 25 | TiO$_2$ | 2.5 | 0.550 | 1.7 | 66 | 0.035 | 1.80 | 98.0 |
| Example 26 | TiO$_2$ | 2.5 | 0.754 | 1.7 | 65 | 0.029 | 1.49 | 97.2 |
| Example 27 | TiO$_2$ | 2.5 | 0.893 | 1.7 | 67 | 0.020 | 1.03 | 96.4 |
| Example 28 | Surface Layer Removed | | | 1.7 | 66 | 0.029 | 1.49 | 96.0 |
| Comparative Example 8 | — | — | — | 1.7 | 66 | 0.003 | 1.12 | 100 |

As shown in Tables 1 to 6, every one of the batteries of the Examples has an internal resistance value lower than that of the battery of a corresponding Comparative Example. That is to say, the battery internal resistance can be suppressed to a low level by forming unevenness on a mixture layer surface so that the thickness variation coefficient of the mixture layer is within a range from 0.01 to 0.30.

Further, a higher packing density of the active material resulted in a more notable effect of suppression of the battery internal resistance. This phenomenon is apparent when the internal resistance values are compared in each of a group consisting of Examples 1, 9, and 25 to 27; a group consisting of Examples 2 and 12 to 14; and a group consisting of Examples 16 and 22 to 24.

Further, also in cases where the surface layer was removed from the surface of the mixture layer (Examples 11 and 28), the same effect as in other Examples was obtained.

In order to reduce the battery internal resistance, it is sufficient to configure such that at least one of the positive electrode mixture layer and the negative electrode mixture layer has a layer thickness variation coefficient of 0.01 to 0.30 or a layer surface tortuosity factor of 1.2 to 2.0. Further, the surface layer containing the inorganic compound is preferably provided on the surface of the at least one of the positive electrode mixture layer and the negative electrode mixture layer.

REFERENCE SIGNS LIST 10 secondary battery
11 positive electrode
12 negative electrode
13 separator
14 electrode assembly
16 outer can
17 sealing assembly
18, 19 insulation plate
20 positive electrode lead
21 negative electrode lead
22 grooved portion
23 internal terminal plate
24 lower valve member
25 insulation member
26 upper valve member
27 cap
28 gasket
30 positive electrode core
31 positive electrode mixture layer
32 surface layer

The invention claimed is:

1. A secondary battery, comprising:
a positive electrode including
a positive electrode core,
a positive electrode mixture layer provided on the positive electrode core, and
a surface layer constituting an outermost surface layer of the positive electrode, the surface layer being in direct contact with the positive electrode mixture layer at a position opposite to the positive electrode core across the positive electrode mixture layer and covers an entire outer surface of the positive electrode mixture layer, the surface layer containing an inorganic compound;
a negative electrode; and
a separator located between the positive electrode and the negative electrode, wherein
a first thickness variation coefficient of the positive electrode mixture layer is 0.01 to 0.30, where the first thickness variation coefficient is a ratio of a standard deviation to a mean of a thickness of the positive electrode mixture layer,
a packing density of an active material in the positive electrode mixture layer is 3.2 g/cm$^3$ or higher, and
a second thickness variation coefficient of the surface layer is 0.51 or greater, where the second thickness variation coefficient is a ratio of a standard deviation to a mean of a thickness of the surface layer.

2. The secondary battery according to claim 1, wherein the average thickness of the surface layer is 0.1 μm to 10 μm.

3. The secondary battery according to claim 1, wherein the inorganic compound is at least one of an oxide, hydroxide, oxyhydroxide, borate, phosphate, and sulfate that contains at least one metal element selected from Al, Sn, W, Nb, Mo, Si, and Ba.

4. The secondary battery according to claim 1, wherein a porosity of the surface layer is 25% to 55%.

5. The secondary battery according to claim 1, wherein a volume-based median diameter of the inorganic compound is 0.05 μm to 1 μm.

* * * * *